United States Patent Office 3,085,023
Patented Apr. 9, 1963

3,085,023
PIGMENT
Felix Frederick Ehrich, Westfield, N.J., assignor to E. I. du Pont de Nemours and Company, Wilmington, Del., a corporation of Delaware
No Drawing. Filed July 25, 1960, Ser. No. 44,875
4 Claims. (Cl. 106—288)

The invention relates to quinacridone pigments of improved lightfastness.

Quinacridone pigments are known products possessing good lightfastness. However, even the most lightfast good organic pigments undergo some degree of degradation upon prolonged exposure to light, and quinacridones are no exception to this rule. Therefore, means have been sought to further improve the lightfastness of quinacridone pigments.

It is an object of the present invention to provide a lightfast quinacridone pigment composition comprising a major amount of a quinacridone and manganous carbonate in a minor amount sufficient to improve the lightstability of the quinacridone.

In a preferred method of treating quinacridone pigments with manganous carbonate, a solution of a water-soluble manganese salt, such as manganous sulfate, is added to an aqueous suspension of the quinacridone pigment which is heated to the boil and a solution containing an excess of a water-soluble carbonate, such as sodium carbonate, is added slowly. As a result, the manganous carbonate is precipitated in the quinacridone-water mixture, and the suspension of the pigment thus treated is cooled somewhat, filtered, washed free of soluble salts, and dried to give a desirable pigment showing improved resistance to darkening under the influence of light when compared to an untreated counterpart.

Quinacridone compounds which may be treated according to this invention include the linear quinacridones having the following structural formula:

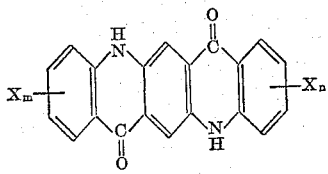

where X is F, Cl, Br, lower alkyl, lower alkoxy, or combinations of these groups, and $m$ and $n$ are integers of from 0–2 both limits being included. The lower alkyl substituents in the above formula include methyl, ethyl, propyl, isopropyl, butyl, isobutyl, and tert. butyl. The lower alkoxy substituents may be methoxy, ethoxy, propoxy, isopropoxy, butoxy, isobutoxy, and tert. butoxy. Linear quinacridones have been widely described in publications and patents, and in referring to these compounds the term "linear" is usually omitted. Methods for producing linear quinacridones are disclosed in U.S. Patents 2,821,529 and 2,821,530.

Another group of compounds which may be treated according to this invention include the quinacridone-quinones, which have the following structural formula:

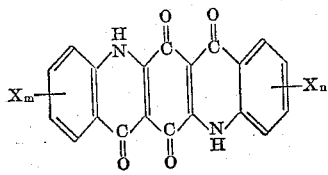

where the symbols X, $m$, and $n$ have the same significance as set forth above in connection with linear quinacridone. Quinacridonequinone, also known as quin (2,3b) acri-done-6,7,13,14(5,12H)tetrone, appears to have been first described by Sharvin in J. Rus. Phys. Chem. Soc. 47, 1260 (1915); C. A. vol. 9, 3056 (1915). It is commonly prepared by condensing benzoquinone with anthranilic acid in the presence of an excess of benzoquinone to give quinone dianthranilic acid which is, in turn, cyclized by heating in concentrated sulfuric acid to give quinacridone-quinone. Substituted quinacridonequinones can be prepared by using the appropriately substituted anthranilic acid. For example, 2-amino-5-chloro benzoic acid can be used to produce a chlorinated derivative of quinacridone-quinone.

A third group of related compounds which can be treated according to this invention are the isoquinacridones having the following structural formula:

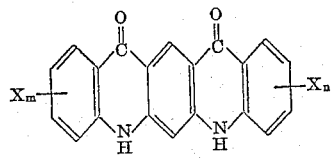

where X is F, Cl, Br, lower alkyl, lower alkoxy, or combinations of these groups, and $m$ and $n$ are integers of from 0–2, both limits being included. Examples of the lower alkyl substituents in the above formula are methyl, ethyl, isopropyl, and n-butyl. Examples of the lower alkoxy substituents are methoxy, ethoxy propoxy, isobutoxy, and tert. butoxy. Isoquinacridone, also known as quin (3,2b) acridine-12,14(5,7H) dione, is described by Eckert and Seidel, J. prakt. Chem. 102, 338–40 (1921), who reacted a 4,6-dibromoisophthalic acid derivative with aniline to obtain 4,6-dianilinoisophthalic acid which was cyclized in a mixture of $PCl_5$ and $AlCl_3$ to the isoquinacridone. Substituted isoquinacridones can be made by the use of appropriately substituted aniline in this reaction.

For a clearer understanding of the invention, the following specific examples are given. These examples are intended to be merely illustrative of the invention and not in limitation thereof. Unless otherwise specified, all parts are by weight.

Example I 880 parts of paste (20.4% solids) of gamma phase quinacridone made as described in U.S. 2,844,581 is slurried with about 2200 parts of water to give a completely dispersed suspension which is heated to the boil while thoroughly agitated. A solution of 38 parts manganous sulfate ($MnSO_4.H_2O$) in about 1000 parts of water is then added and while maintaining at the boil, a solution of 32 parts sodium carbonate in 500 parts of water is added slowly. Boiling is continued for a few minutes and the charge is cooled by adding an equal volume of cold water. It is then filtered, washed free of alkali and of soluble salts and dried at about 80° C. After pulverizing, about 206 parts of a bright red powder treated with about 12.5% of manganous carbonate is obtained. Upon dispersion in an alkyd resin and exposure to the sunshine of a panel upon which the resulting dispersion has been applied, there is a marked reduction in the degree of darkening which occurs in comparison with a similar panel prepared from an untreated pigment. When 5% aluminum flake, based on the colored pigment, is added to the enamels, the improved resistance to darkening is even more apparent.

Example II 900 parts of a paste (20% solids) of beta phase quinacridone (as described in U.S. 2,844,485) is slurried with about 2000 parts of water to give a completely dispersed suspension to which a solution of 47 parts of manganous sulfate ($MnSO_4.H_2O$) in 500 parts of water is added. The suspension is heated rapidly to the boil, and a solution of 35 parts sodium carbonate in 500 parts of water is added slowly to the agitated suspension while maintaining at the boil. The charge is cooled by adding about an equal volume of cold water, filtered, washed free of soluble salts and dried at about 80° C. After pulverizing, there is obtained about 212 parts of violet colored powder containing about 15% of manganous carbonated. This product exhibits a marked improvement over an untreated pigment with respect to resistance to darkening on outdoor exposure of an enamel containing this pigment.

*Example III*

Quinacridonequinone (6,13-diketoquinacridone) is a yellow pigment of desirable color with a high melting point and extreme insolubility in organic solvents, but it darkens badly on exposure to sunlight. 1200 parts of a 15% aqueous paste of quinacridonequinone (180 parts dry basis) is dispersed in 1800 parts of water to a thin suspension to which is added a solution of 66 parts manganous sulfate ($MnSO_4.H_2O$) in 500 parts of water. The suspension is heated to the boil and a solution of 50 parts sodium carbonate in 750 parts of water is added slowly while the suspension is kept boiling and well stirred. After boiling a few more minutes, an equal volume of cold water is added, the suspension filtered and washed free of alkali and finally dried to give about 225 parts of a yellow pigment which may be pulverized to a bright yellow powder. Upon exposure of a panel, coated with a yellow enamel made from this pigment, to sunlight for several months, the degree of darkening is markedly reduced in comparison with an enamel from an untreated pigment.

*Example IV*

A very desirable scarlet pigment comprises a solid solution of about 60% quinacridone and 40% 4,11-dichloroquinacridone resulting when these products in the desired ratio are suspended together in boiling dimethylformamide for several hours and then isolated from the solvent by diluting with water, filtering and washing solvent-free to give a paste of about 23% solids. Although such a product is generally of excellent lightfastness, it still shows perceptible darkening on exposure to sunlight for several months and is noticeably improved by treating with about 7% manganous carbonate. Following the general procedures of Example I, this is done by adding 20 parts of manganous sulfate ($MnSO_4.H_2O$) in 300 parts of water to a slurry of 783 parts of the 23% pigment paste and precipitating at the boil with a solution of 18 parts sodium carbonate in 300 parts of water. The resulting pigment comprises about 194 parts of a brilliant scarlet which is substantially free of darkening on exposure to sunlight.

*Example V*

900 parts of a 20% paste of 2,9-dimethylquinacridone (see U.S. 2,821,529) is treated, following the general procedure of Example II, with 29 parts of manganous sulfate in 500 parts of water which is precipitated at the boil with about 24 parts of sodium carbonate in 500 parts of water. The pigment isolated therefrom comprises about 200 parts of a brilliant magenta powder containing about 10% of manganous carbonate. It is substantially free of any tendency to darken on exposure to the elements.

The amount of manganous carbonate influences the degree of improvement but may be varied over a rather wide range while still showing results of value. The usage in the examples varies from about 10% of the total pigment in Example V to about 20% in Example III. This range can be extended at the lower extreme as to little as about 3% with reduced but, nevertheless, notice- able benefits. Amounts in excess of the 20% in Example III may also be used though the beneficial effect does not follow the increased usage above about 25% and the diluent effect may be undesirable. Thus, a suitable range of usage is between about 3% and 25% based on the total pigment weight, with a range of about 7% to 15% being preferred. A preferred specific amount is 10%.

The method of application of the manganous carbonate to the pigment appears to influence the result. In the examples, a solution of a soluble manganese salt is added to the pigment slurry which is heated to the boil and the agent precipitated on the pigment by the addition of a carbonate solution in excess. The precipitation at high temperatures (between about 85° C. and boil, preferably at or near the boil) seems to be necessary for optimum results. The nature of the starting manganous salt is not critical as long as it is water soluble. Thus, the chloride, nitrate, or acetate may replace the sulfate on an equivalent weight basis. The nature of the carbonate solution is not critical. The sodium salt is used because of its ready availability but other water-soluble carbonates may be used, especially potassium carbonate. The amount of carbonate should be at least the stoichiometric amount for the production of manganous carbonate. Preferably, an excess, up to about 30%, of carbonate is used.

It will be apparent to those skilled in the art that the precipitate formed in this invention as a result of the addition of the carbonate solution to the solution of the manganese salt is fundamentally a manganous carbonate. However, it will also be apparent to those skilled in the art that the exact composition of this precipitate is complex, and it will vary depending upon the proportions of the reactant. For example, when a large excess of sodium carbonate is used, the composition probably includes some manganous hydroxide. In view of these considerations, the term "manganous carbonate" is meant to include not only the manganous carbonate which is present in the precipitate but also the other constituents which go to make up this material.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A pigment composition of improved lightfastness consisting essentially of a major amount of a quinacridone pigment having a structural formula from the group consisting of

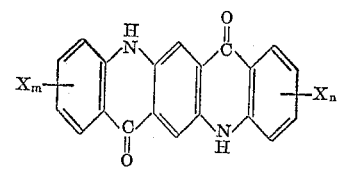

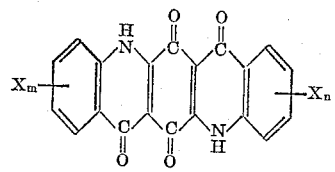

and

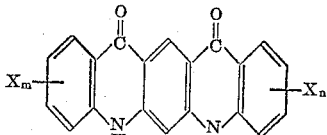

and combinations thereof, where X is F, Cl, Br, lower alkyl, lower alkoxy, and combinations of these groups, and $m$ and $n$ are integers of from 0–2, both limits being included, and a minor amount of manganous carbonate in an amount sufficient to improve the lightfastness of the pigment composition.

2. The composition of claim 1 in which the quinacridone compound is linear quinacridone.

3. The composition of claim 1 in which the quinacridone compound is quinacridonequinone.

4. The composition of claim 1 in which the quinacridone compound is 2,9-dimethylquinacridone.

References Cited in the file of this patent

UNITED STATES PATENTS

| | | |
|---|---|---|
| 2,821,529 | Struve | Jan. 28, 1958 |
| 2,821,530 | Struve | Jan. 28, 1958 |
| 2,844,485 | Struve | July 22, 1958 |
| 2,969,366 | Griswold et al. | Jan. 24, 1961 |